(12) United States Patent
Zhao et al.

(10) Patent No.: US 8,755,676 B2
(45) Date of Patent: Jun. 17, 2014

(54) VIDEO RECORDING METHOD AND VIDEO RECORDING DEVICE

(75) Inventors: Shao-Hai Zhao, Jiangsu (CN); Kai-Jian Yu, NanKang (TW); Qiang-Hua Liu, Jiangsu (CN)

(73) Assignee: Sernet (Suzhou) Technologies Corporation, Jiangsu (CN)

( * ) Notice: Subject to any disclaimer, the term of this patent is extended or adjusted under 35 U.S.C. 154(b) by 24 days.

(21) Appl. No.: 13/586,340

(22) Filed: Aug. 15, 2012

(65) Prior Publication Data

US 2013/0077942 A1    Mar. 28, 2013

(30) Foreign Application Priority Data

Sep. 28, 2011  (CN) .......................... 2011 1 0294696

(51) Int. Cl.
  *H04N 5/917*  (2006.01)
(52) U.S. Cl.
  USPC ............................. 386/328; 386/241; 386/248

(58) Field of Classification Search
  USPC ........................................ 286/241, 248, 328
  See application file for complete search history.

(56) References Cited

U.S. PATENT DOCUMENTS

| | | | | |
|---|---|---|---|---|
| 5,253,053 A | * | 10/1993 | Chu et al. | 375/240.23 |
| 6,148,135 A | * | 11/2000 | Suzuki | 386/201 |
| 2009/0225193 A1 | * | 9/2009 | Ishii | 348/231.99 |

* cited by examiner

*Primary Examiner* — Thai Tran
*Assistant Examiner* — Jose Mesa
(74) *Attorney, Agent, or Firm* — McClure, Qualey & Rodack, LLP

(57) ABSTRACT

A video recording method is provided. The method includes steps of: determining a threshold bit rate according to a storage space and an expected recording period; capturing a video data; determining whether a current bit rate is greater than the threshold bit rate; storing a predictive frame of the video data when the current bit rate is not greater than the threshold bit rate; and not storing the predictive frame when the current bit rate is greater than the threshold bit rate.

18 Claims, 3 Drawing Sheets

VIDEO RECORDING METHOD AND VIDEO RECORDING DEVICE

This application claims the benefit of People's Republic of China application Serial No. 201110294696.X, filed Sep. 28, 2011, the subject matter of which is incorporated herein by reference.

BACKGROUND OF THE INVENTION

1. Field of the Invention

The invention relates in general to a recording method and device, and more particularly to a video recording method and device.

2. Description of the Related Art

A current MPEG compression method divides an image signal frame into multiple groups of pictures (GOP). An entry point of each GOP is an intra frame, which is followed by a predictive frame. The intra frame does not refer to data of other frames, and hence serves as an entry point for decoding in a decoding process. That is, without needing to refer to data of other frames, a decoding process can be performed on the intra frame. To effectively reduce a data amount of video data for facilitating data transmission, most image coding mechanisms utilize the intra frame as a basic prediction method for generating a predictive frame having an even smaller data amount.

However, a current video recording method cannot ensure that a desired video data can be successfully recorded in a predetermined storage space and within a predetermined recording period. Another conventional video recording method simultaneously discards the intra frame and the predictive frame, such that an unsmooth video playback is incurred.

SUMMARY OF THE INVENTION

The invention is directed to a video recording method and device, which determines whether to discard a predictive frame according to a current bit rate to ensure a video data is successfully recorded in a storage space and within an expected recording period. Further, without discarding the intra frame, the occurrence of unsmooth video playback is also eliminated.

A video recording method is provided by the present invention. The method includes steps of: determining a threshold bit rate according to a storage space and an expected recording period; capturing a video data; determining whether a current bit rate is greater than the threshold bit rate; storing a predictive frame of the video data when the current bit rate is not greater than the threshold bit rate; and not storing the predictive frame when the current bit rate is greater than the threshold bit rate.

A video recording device is further provided by the present invention. The device includes a hard drive, a bit rate determining circuit, a video capturing circuit and a data amount control circuit. The bit rate determining circuit determines a threshold bit rate according to a storage space of the hard drive and an expected recording period. The video capturing circuit captures a video data. The data amount control circuit determines whether a current bit rate is greater than the threshold bit rate, stores a predictive frame of the video data to the hard drive when the current bit rate is not greater than the threshold bit rate, and does not store the predictive frame to the hard drive when the current bit rate is greater than the threshold bit rate.

The above and other aspects of the invention will become better understood with regard to the following detailed description of the preferred but non-limiting embodiment. The following description is made with reference to the accompanying drawings.

DETAILED DESCRIPTION OF THE INVENTION

Figure 1:
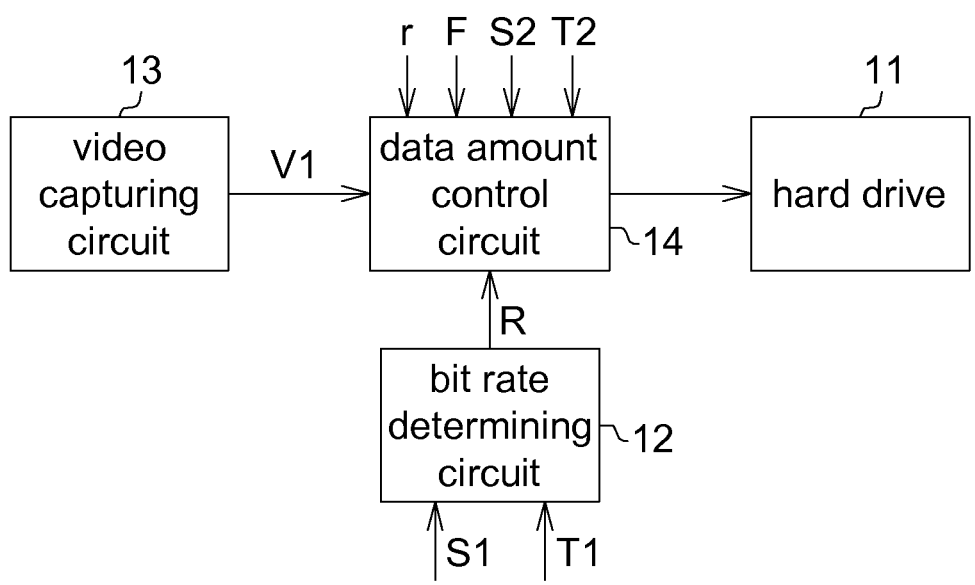
FIG. 1 is a schematic diagram of a video recording device according to one embodiment of the present invention.
Figure 2A:
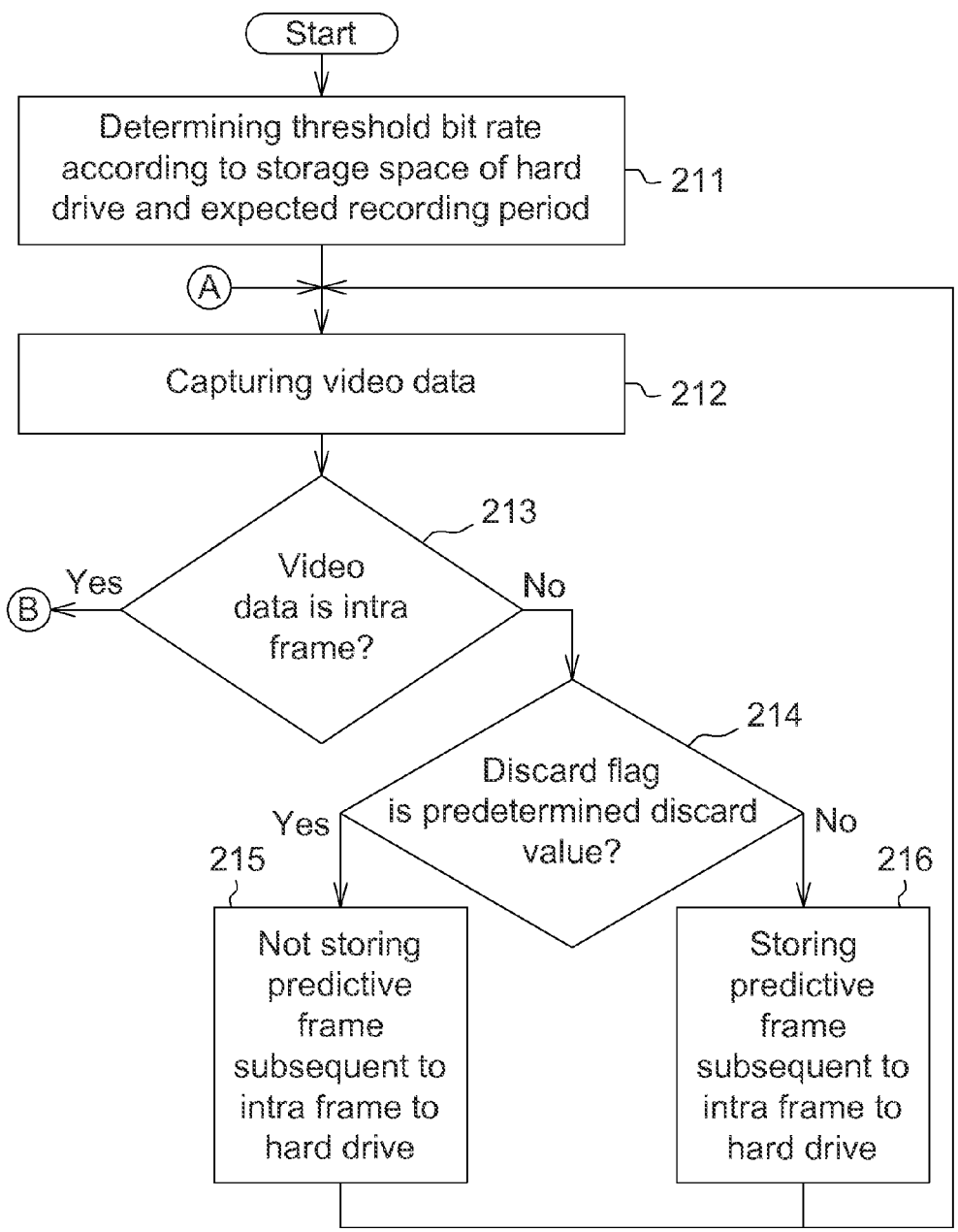
FIGS. 2A and 2B are a flowchart of a video recording method according to one embodiment of the present invention.
Figure 2B:
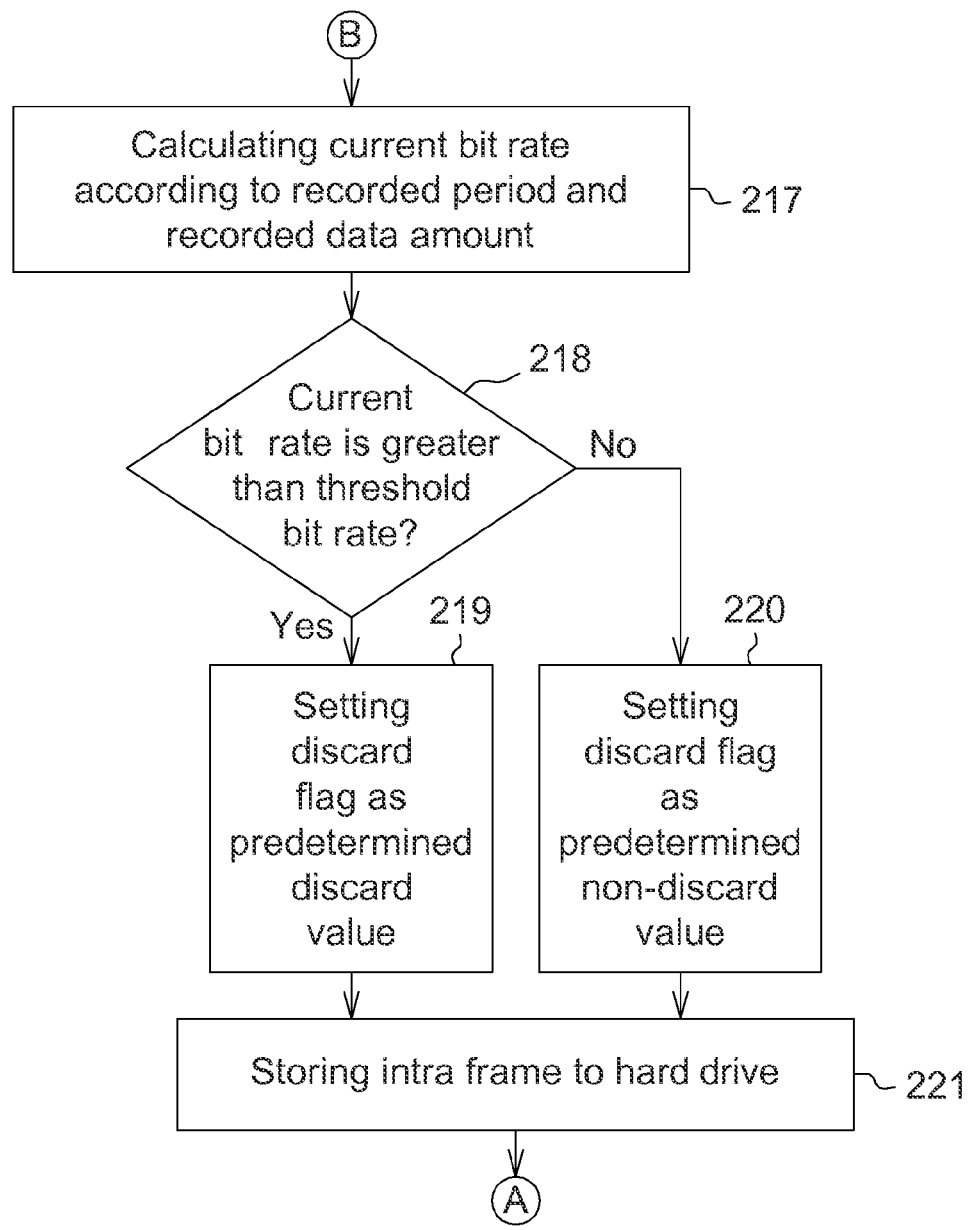

Referring to FIGS. 1, 2A and 2B, FIG. 1 shows a schematic diagram of a video recording device according to one embodiment of the present invention; FIGS. 2A and 2B show a flowchart of a video recording method according to one embodiment of the present invention. As shown in FIG. 1, a video recording device 1 includes a hard drive 11, a bit rate determining circuit 12, a video capturing circuit 13 and a data amount control circuit 14. The data amount control circuit 14 is coupled to the hard drive 11, the bit rate determining circuit 12 and the video capturing circuit 13. For example, the bit rate determining circuit 12 and the data amount control circuit 14 are implemented by a processor.

Referring to FIGS. 2A and 2B, the video recording method includes the following steps. In Step 211, the bit rate determining circuit 12 determines a threshold bit rate R according to a storage space S1 of the hard drive 11 and an expected recording period T1. For example, the threshold bit rate R is a ratio of the storage space S1 and the expected recording period T1. In Step S212, the video capturing circuit 13 captures a video data V1. For example, a format of the video data V1 is H.264 or MPEG4. In Step 213, the data amount control circuit 14 determines whether the video data V1 is an intra frame. In Step 214, when the video data V1 is not an intra frame, the data amount control circuit 14 determines whether a discard flag F is a predetermined discard value. For example, the predetermined discard value is 1. When the discard flag F is the predetermined discard value, Step 215 is performed, in which the data amount control circuit 14 does not store a predictive frame subsequent to the intra frame to the hard drive 11. Conversely, when the discard flag F is not the predetermined discard value, Step 216 is performed, in which the data amount control circuit 14 stores the predictive frame subsequent to the intra frame to the hard drive 11. For example, the predetermined non-discard value is 0.

When the video data V1 is an intra frame, as shown in Step 217, the data amount control circuit 14 calculates a current bit rate r according to a recorded period T2 and a recorded data amount S2. For example, the current bit rate r is a ratio of the recorded data amount S2 and the recorded period T2. In Step 218, the bit amount control circuit 14 determines whether the current bit rate r is greater than the threshold bit rate R. When the current bit rate r is greater than the threshold bit rate R, as shown in Step 219, the data amount control circuit 14 sets the discard flag F as the predetermined discard value. Conversely, when the current bit rate r is not greater than the threshold bit rate R, as shown in Step 220, the data amount control circuit 221 sets the discard flag F as the predetermined non-discard value. After setting the discard flag F, Step 221 is performed to store the intra frame to the hard drive 11.

In the above embodiment, it is determined whether the predictive frame is to be stored according to the current bit rate, so that the expected record period T1 of the hard drive 11 can be ensured. Further, the intra frame is not discarded in the above embodiment and so an occurrence of unsmooth video playback is further prevented.

While the invention has been described by way of example and in terms of the preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video recording method, comprising: determining a threshold bit rate according to a storage space and an expected recording period; capturing a video data; determining whether a current bit rate is greater than the threshold bit rate; when the current bit rate is not greater than the threshold bit rate, storing a predictive frame of the video data; and when the current bit rate is greater than the threshold bit rate, not storing the predictive frame; determining whether the video data is an intra frame; and when the video data is the intra frame, calculating the current bit rate according to a recorded period and a recorded data amount.

2. The method according to claim 1, further comprising:
determining whether the video data is an intra frame; and
when the video data is not the intra frame, determining whether a discard flag is a predetermined discard value;
wherein, the predictive frame subsequent to the intra frame is not stored when the discard flag is the predetermined discard value.

3. The method according to claim 2, wherein the predictive frame is stored when the discard flag is not the predetermined discard value.

4. The method according to claim 1, further comprising:
when the current bit rate is greater than the threshold bit rate, setting a discard flag as a predetermined discard value; and
when the current bit rate is not greater than the threshold bit rate, setting the discard flag as a predetermined non-discard value.

5. A video recording device, comprising: a hard drive; a bit rate determining circuit, for determining a threshold bit rate according to a storage space of the hard drive and an expected recording period; a video capturing circuit, for capturing a video data; and a data amount control circuit, for determining whether a current bit rate is greater than the threshold bit rate, storing a predictive frame of the video data to the hard drive when the current bit rate is not greater than the threshold bit rate, and not storing the predictive frame to the hard drive when the current bit rate is greater than the threshold bit rate, wherein the data amount control circuit determines whether the video data is an intra frame, and calculates a current bit rate according to a recorded period and a recorded data amount.

6. The device according to claim 5, wherein the data amount control circuit determines whether the video data is an intra frame, determines whether a discard flag is a predetermined discard value when the video data is not the intra frame, and does not store the predictive frame subsequent to the intra frame to the hard drive when the discard flag is the predetermined discard value.

7. The device according to claim 6, wherein the data amount control circuit stores the predictive frame to the hard drive when the discard flag is not the predetermined discard value.

8. The device according to claim 5, wherein the data amount control circuit sets a discard flag as a predetermined discard value when the current bit rate is greater than the threshold bit rate, and sets the discard flag as a predetermined non-discard value when the current bit rate is not greater than the threshold bit rate.

9. A method for recording video data, comprising: determining a threshold bit rate according to a storage space and an expected recording period; calculating a current bit rate according to a recorded period and a recorded data amount; determining whether the current bit rate is greater than the threshold bit rate; and when the current bit rate is greater than the threshold bit rate, storing an intra frame of the video data and discarding a predictive frame of the video data, wherein the predictive frame is subsequent to the intra frame.

10. The method according to claim 9, further comprising: when the current bit rate is not greater than the threshold bit rate, storing the intra frame and the predictive frame.

11. The method according to claim 9, further comprising:
when the current bit rate is greater than the threshold bit rate, setting a discard flag as a predetermined discard value;
when the current bit rate is not greater than the threshold bit rate, setting the discard flag as a predetermined non-discard value; and
determining whether the current bit rate is greater than the threshold bit rate by checking the discard flag.

12. The method according to claim 9, wherein the threshold bit rate is a ratio of the storage space and the expected recording period, and the current bit rate is a ratio of the recorded data amount and the recorded period.

13. A video recording device, comprising: a hard drive; a bit rate determining circuit, for determining a threshold bit rate according to a storage space of the hard drive and an expected recording period; a video capturing circuit; and a data amount control circuit, configured to: calculate a current bit rate according to a recorded period and a recorded data amount, determine whether the current bit rate is greater than the threshold bit rate; store an intra frame to the hard drive and discard a predictive frame when the current bit rate is greater than the threshold bit rate, wherein the predictive frame is captured by the video capturing circuit subsequent to the intra frame.

14. The device according to claim 13, wherein the data amount control circuit is further configured to: store the intra frame to the hard drive and store the predictive frame to the hard drive when the current bit rate is not greater than the threshold bit rate.

15. The device according to claim 13, wherein the data amount control circuit is further configured to:
set a discard flag as a predetermined discard value when the current bit rate is greater than the threshold bit rate, set the discard flag as a predetermined non-discard value when the current bit rate is not greater than the threshold bit rate, and determine whether the current bit rate is greater than the threshold bit rate by checking the discard flag.

16. The device according to claim 13, wherein the threshold bit rate is a ratio of the storage space and the expected recording period, and the current bit rate is a ratio of the recorded data amount and the recorded period.

17. The method according to claim 1, wherein the threshold bit rate is a ratio of the storage space and the expected recording period, and the current bit rate is a ratio of a recorded data amount and a recorded period.

18. The device according to claim 5, wherein the threshold bit rate is a ratio of the storage space and the expected recording period, and the current bit rate is a ratio of a recorded data amount and a recorded period.

\* \* \* \* \*